(12) United States Patent
Norair (10) Patent No.: US 8,909,865 B2
(45) Date of Patent: Dec. 9, 2014

(54) METHOD AND APPARATUS FOR PLUG AND PLAY, NETWORKABLE ISO 18000-7 CONNECTIVITY

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 73 days.

(21) Appl. No.: 13/396,708

(22) Filed: Feb. 15, 2012

(65) Prior Publication Data

US 2012/0207141 A1 Aug. 16, 2012

Related U.S. Application Data

(60) Provisional application No. 61/463,224, filed on Feb. 15, 2011.

(51) Int. Cl.
*G06F 13/00* (2006.01)
*H01Q 1/24* (2006.01)
*H01Q 1/08* (2006.01)
*H01Q 1/10* (2006.01)
*H01Q 1/22* (2006.01)

(52) U.S. Cl.
CPC ............ *H01Q 1/084* (2013.01); *H01Q 1/242* (2013.01); *H01Q 1/10* (2013.01); *H01Q 1/2275* (2013.01)
USPC ....................................... 711/119

(58) Field of Classification Search
USPC .................. 711/119, 122; 370/342
See application file for complete search history.

(56) References Cited

U.S. PATENT DOCUMENTS

| 5,338,625 A | 8/1994 | Bates |
| 5,729,557 A | 3/1998 | Gardner et al. |
| 5,959,281 A | 9/1999 | Domiteaux |
| 6,115,379 A | 9/2000 | Flanders et al. |
| 6,307,846 B1 | 10/2001 | Willey |
| 6,330,700 B1 | 12/2001 | Morris |

(Continued)

FOREIGN PATENT DOCUMENTS

| EP | 1321009 B1 | 1/2007 |
| WO | 2006001556 A1 | 1/2006 |
| WO | 2009023592 A2 | 2/2009 |

OTHER PUBLICATIONS

PCT Int'l Searching Authority, Notification Concerning Transmittal of the Int'l Search Report and The Written Opinion of the Int'l Searching authority or the Declaration in Int'l application No. PCT/US2012/027386 dated Oct. 16, 2012.

(Continued)

*Primary Examiner* — Hassan Phillips
*Assistant Examiner* — Ajay Cattungal
(74) *Attorney, Agent, or Firm* — McAndrews, Held & Malloy, Ltd.

(57) ABSTRACT

A device may comprise a Universal Serial Bus (USB) interface and a wireless interface operable to communicate in accordance with the ISO 18000-7 standard. The device may be operable to receive a command via the USB interface and transmit the command via the wireless interface. The device may be operable to receive data via the wireless interface and transmit the data via the USB interface. A form factor of the USB device may be such that it can be plugged directly into a USB port without any external cabling between the USB device and said USB port.

20 Claims, 7 Drawing Sheets (56) References Cited

U.S. PATENT DOCUMENTS

| | | |
|---|---|---|
| 6,381,243 B1 | 4/2002 | Ekstedt |
| 6,388,997 B1 | 5/2002 | Scott |
| 6,549,959 B1 | 4/2003 | Yates et al. |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,233,603 B2 | 6/2007 | Lee |
| 7,280,555 B2 | 10/2007 | Stanforth |
| 7,305,237 B2 | 12/2007 | Stephens |
| 7,308,103 B2 | 12/2007 | Corcoran et al. |
| 7,330,446 B2 | 2/2008 | Lee |
| 7,369,512 B1 | 5/2008 | Shurbanov et al. |
| 7,606,256 B2 | 10/2009 | Vitebsky |
| 7,643,509 B2 | 1/2010 | Han et al. |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,805,129 B1 | 9/2010 | Issa |
| 7,814,107 B1 | 10/2010 | Thirumalai et al. |
| 7,890,839 B2 | 2/2011 | Iwami |
| 7,962,361 B2 | 6/2011 | Ramchandani |
| 2002/0025823 A1 | 2/2002 | Hara |
| 2002/0078045 A1 | 6/2002 | Dutta |
| 2003/0115369 A1 | 6/2003 | Walter |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1 | 5/2006 | Zellner |
| 2006/0145817 A1* | 7/2006 | Aikawa et al. ............... 340/10.3 |
| 2006/0175420 A1* | 8/2006 | Satou ........................... 235/492 |
| 2006/0205343 A1* | 9/2006 | Runyon et al. ............... 455/11.1 |
| 2006/0219776 A1 | 10/2006 | Finn |
| 2006/0220867 A1 | 10/2006 | Dixon |
| 2007/0000316 A1 | 1/2007 | Lauer |
| 2007/0010928 A1 | 1/2007 | Brusarosco |
| 2007/0083924 A1 | 4/2007 | Lu |
| 2007/0099641 A1 | 5/2007 | Lastinger |
| 2007/0125836 A1 | 6/2007 | McAllister et al. |
| 2007/0211532 A1 | 9/2007 | Gonzalez et al. |
| 2007/0232281 A1 | 10/2007 | Nakai |
| 2007/0295074 A1 | 12/2007 | Kobayakawa |
| 2008/0041936 A1 | 2/2008 | Vawter |
| 2008/0069097 A1* | 3/2008 | Motegi ........................... 370/389 |
| 2008/0075123 A1 | 3/2008 | Fourcand |
| 2008/0107060 A1 | 5/2008 | Andou et al. |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Schoo et al. |
| 2008/0209322 A1 | 8/2008 | Kaufman |
| 2008/0228592 A1 | 9/2008 | Kotas |
| 2008/0238621 A1 | 10/2008 | Rofougaran |
| 2008/0256409 A1 | 10/2008 | Oran et al. |
| 2008/0302177 A1 | 12/2008 | Sinnett |
| 2008/0320139 A1 | 12/2008 | Fukuda |
| 2009/0003376 A1 | 1/2009 | Horvat |
| 2009/0055377 A1 | 2/2009 | Hedge |
| 2009/0069049 A1 | 3/2009 | Jain |
| 2009/0073070 A1* | 3/2009 | Rofougaran ................... 343/793 |
| 2009/0113267 A1 | 4/2009 | Harrison |
| 2009/0138948 A1 | 5/2009 | Calamera |
| 2009/0141531 A1 | 6/2009 | Abedin |
| 2009/0171749 A1 | 7/2009 | Laruelle |
| 2009/0171947 A1 | 7/2009 | Karayel |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1* | 11/2009 | Kuykendal ..................... 701/35 |
| 2010/0026589 A1 | 2/2010 | Dou |
| 2010/0078471 A1 | 4/2010 | Lin |
| 2010/0082893 A1 | 4/2010 | Ma et al. |
| 2010/0097957 A1 | 4/2010 | Pirzada et al. |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0256976 A1 | 10/2010 | Atsmon |
| 2010/0295681 A1 | 11/2010 | Burns et al. |
| 2011/0003607 A1 | 1/2011 | Forenza et al. |
| 2011/0007733 A1 | 1/2011 | Kubler et al. |
| 2011/0112892 A1 | 5/2011 | Tarantino |
| 2011/0156872 A1* | 6/2011 | Wengrovitz .................. 340/10.1 |
| 2012/0001730 A1 | 1/2012 | Potyrailo |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0191901 A1 | 7/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2012/0242455 A1* | 9/2012 | Hale et al. .................... 340/10.1 |

OTHER PUBLICATIONS

PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).

PCT International Searching Authority, Notification Concerning Transmittal of the International Search Report and The Written Opinion of the International Searching Authority, or the Declaration, in International application No. PCT/US2011/55118, dated Feb. 28, 2012. (25 pages).

PCT International Searching Authority, Notification Concerning Transmittal of the International Search Report and The Written Opinion of the International Searching Authority, or the Declaration, in International application No. PCT/US11/55082, dated Mar. 1, 2012 (13 pages).

(56) References Cited

OTHER PUBLICATIONS

PCT International Searching Authority, Notification Concerning Transmittal of the International Search Report and The Written Opinion of the International Searching Authority, or the Declaration, in International application No. PCT/US11/55934, dated Mar. 6, 2012 (11 pages).

PCT International Searching Authority, Notification Concerning Transmittal of the International Search Report and The Written Opinion of the International Searching Authority, or the Declaration, in International application No. PCT/US20111055929, dated Jan. 30, 2012. (15 pages).

PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and The Written Opinion of the International Searching Authority, or the Declaration, in International application No. PCT/US11/059304, dated Mar. 9, 2012 (11 pages).

PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and The Written Opinion of the International Searching Authority, or the Declaration, in International application No. PCT/US12/22002, dated May 8, 2012. (13 pages).

PCT International Searching Authority, Notification Concerning Transmittal of the International Search Report and The Written Opinion of the International Searching Authority, or the Declaration, in International application No. PCT/US2012/025191 dated May 25, 2012. (8 pages).

PCT International Searching Authority, Notification Concerning Transmittal of the International Search Report and The Written Opinion of the International Searching Authority, or the Declaration, in International application No. PCT/US2012/025197 dated May 25, 2012. (7 pages).

PCT International Searching Authority, Notification Concerning Transmittal of the International Search Report and The Written Opinion of the International Searching Authority, or the Declaration, in International application No. PCT/US2012/027381 dated May 31, 2012. (13 pages).

PCT International Searching Authority, Notification Concerning Transmittal of the International Search Report and The Written Opinion of the International Searching Authority, or the Declaration, in International application No. PCT/US2012/027382 dated May 31, 2012. (10 pages).

PCT International Searching Authority, Notification Concerning Transmittal of the International Search Report and The Written Opinion of the International Searching Authority, or the Declaration, in International application No. PCT/US12/22005, dated Mar. 29, 2012. (12 pages).

* cited by examiner

METHOD AND APPARATUS FOR PLUG AND PLAY, NETWORKABLE ISO 18000-7 CONNECTIVITY

CLAIM OF PRIORITY

This patent application makes reference to, claims priority to and claims benefit from U.S. Provisional Patent Application Ser. No. 61/463,224 entitled "USB Device for Plug & Play, Networkable DASH7 Connectivity," and filed on Feb. 15, 2011.

The above-referenced application is hereby incorporated herein by reference in its entirety.

INCORPORATION BY REFERENCE

This patent application also makes reference to:
U.S. Provisional Patent Application Ser. No. 61/464,376 entitled "Advanced Communication System for Wide-area Low Power Wireless Applications and Active RFID" and filed on Mar. 2, 2011;
U.S. patent application Ser. No. 13/267,640 entitled "Method and Apparatus for Adaptive Searching of Distributed Datasets" and filed Oct. 6, 2011;
U.S. patent application Ser. No. 13/270,802 entitled "Method and Apparatus for a Multi-band, Multi-mode Smartcard" and filed Oct. 11, 2011;
U.S. patent application Ser. No. 13/354,513 entitled "Method and Apparatus for Memory Management" and filed on Jan. 20, 2012; and
U.S. patent application Ser. No. 13/354,615 entitled "Method and Apparatus for Discovering People, Products, and Services via a Localized Wireless Network" and filed on Jan. 20, 2012.

Each of the above-referenced applications is hereby incorporated herein by reference in its entirety.

FIELD OF THE INVENTION

Certain embodiments of the invention relate to wireless networking. More specifically, certain embodiments of the invention relate to a method and apparatus for plug and play, networkable ISO 18000-7 connectivity.

BACKGROUND OF THE INVENTION

Existing methods and systems for ISO 18000-7 communications are of limited functionality and flexibility. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for plug and play, networkable ISO 18000-7 connectivity, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g.," and "for example," introduce a list of one or more non-limiting examples, instances, or illustrations.

Figure 1:
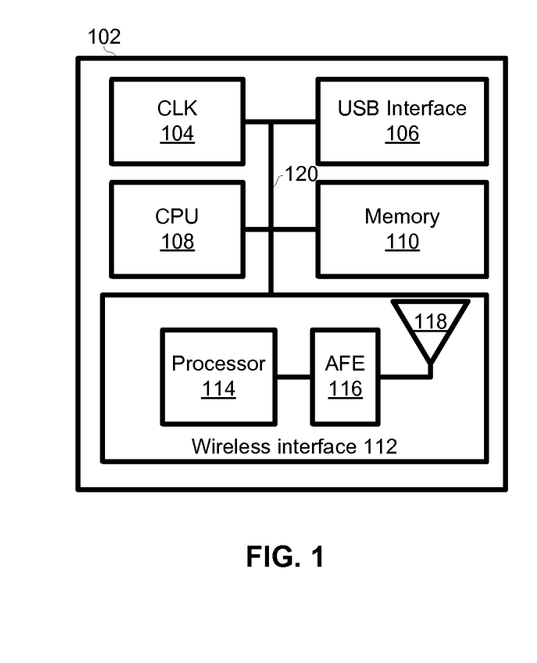
FIG. 1 is block diagram of an exemplary USB device which enables communications in conformance with ISO 18000-7.

FIG. 1 is block diagram of an exemplary USB device which enables communications in conformance with ISO 18000-7. The USB device 102 comprises a clock 104, a USB interface 106, a CPU 108, a memory 110, and a wireless interface 112 comprising a processor 114, an analog front end (AFE) 116, and an antenna 118.

The clock 104 may be operable to generate one or more oscillating signals which may be utilized to control synchronous circuitry of the USB device 102. The clock 104 may comprise, for example, one or more crystal oscillators, phase-locked loops, and/or direct digital synthesizers.

The USB interface 106 may be operable to receive information via the bus 120, process the information to generate one or more USB packets, and transmit the USB packets onto a USB bus. Similarly, the USB interface 106 may be operable to receive USB packets, process the packets recover received information, and output the information on the bus 120.

The CPU 108 may be operable to control operation of the device 102. The CPU 108 may, for example, execute instructions and perform arithmetic and/or logic operations in response to the executed instructions. The CPU 108 may generate one or more control signals for controlling the operation of the device 102.

The memory module 110 may comprise volatile memory operable to store runtime data and/or non-volatile memory operable to store data that is persistent over multiple power cycles of the device 102. The memory module 110 may comprise addressing/control logic which implements read and write operations in response to read and write commands issued to the memory module 110. In an exemplary embodiment, the memory may be managed as described in the above-incorporated U.S. patent application Ser. No. 13/354,513. In an exemplary embodiment, the memory module 110 may store data arranged as a Universal Data Block (UDB) as, for example, described in the above-incorporated U.S. patent application Ser. No. 13/354,615. In an exemplary embodiment, the memory module 110 may store device, configuration, interface, and/or endpoint descriptors associated with a USB Device Class to which the device 102 belongs. The descriptors for the various USB Device Classes are set forth in the USB Device Class Definitions maintained by the USB Implementer's Forum (USB-IF).

The wireless interface 112 may be operable to communicate wirelessly in accordance with, for example, protocols specified in ISO 18000-7, and/or protocols described in the above-incorporated U.S. Provisional Patent Application 61/464,376 filed on Mar. 2, 2011 (collectively referred to herein as ISO 18000-7). The invention is not necessarily limited in regard to the frequencies on which the wireless interface 112 may communicate.

Figure 2A:
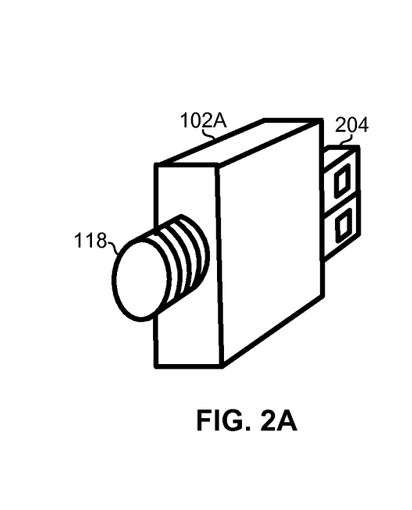
FIGS. 2A-2C depict exemplary form factors of a USB device which enables communications in conformance with ISO 18000-7.
Figure 2B:
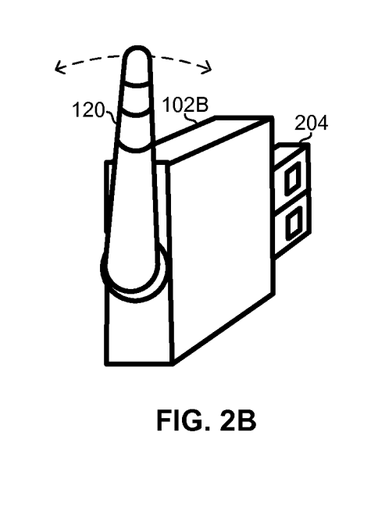
Figure 2C:
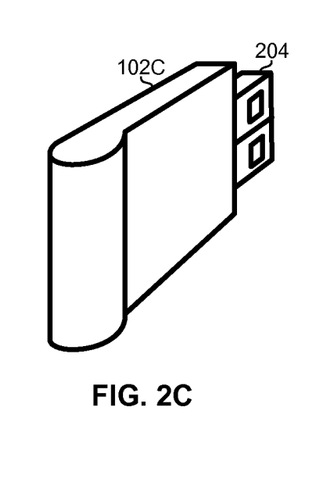

The processor 114 may comprise circuitry operable to interface with the AFE 116 to receive and transmit data, and to process received and to-be-transmitted data. For transmission, the processor 114 may be operable to receive data via the bus 120, packetize and/or otherwise process the data to prepare it for transmission in accordance with the wireless protocol(s) in use, and output the data to the AFE 116 for transmission. For reception, the processor 114 may be operable to receive data via the AFE 116, process the received data in accordance with the wireless protocol(s) in use, and output received data onto the bus 120. Although FIG. 1 depicts the antenna 118 as being integrated with the device 102, as shown in FIGS. 2A-2C, various USB devices may have internal antennas, external but affixed antennas, and/or a connector for connecting to a removable external antenna.

Upon the device 102 being connected to a USB bus (e.g., plugged into a USB port of a computing device), the USB interface 106 may participate in enumeration of the device 102 in accordance with USB specifications. Enumeration may comprise descriptors being sent by the device 102. In an exemplary embodiment, the descriptors stored in, and transmitted by the device 102 during enumeration, may be as set forth in the USB Device Class Definition for Printing Devices, for example. In such an embodiment, after setup of the USB connection, the messages exchanged over the USB bus, and the manner in which the messages are exchanged, may be in accordance with the USB Device Class Definition for Printing Devices, for example. In other exemplary embodiments, the device 102 may use a different USB device class definition such as, for example, the device class definition for mass storage devices or the device class definition for human-interface devices.

During operation, the device 102 may perform actions in response to USB packets received via the USB interface 106. The USB packets may, for example, comprise an instruction in accordance with an application programming interface (API) of the device 102. For example, in response to such an instruction, the device 102 may generate and transmit one or more ISO 18000-7 commands via the wireless interface 112. Additionally or alternatively, the USB packets may, for example, comprise data to be transmitted via the wireless interface 112. The data may be, for example, data retrieved from memory in response to a previously-received ISO 18000-7 command. In such instances, the data may be extracted from the USB packets by the USB interface 106 and/or the CPU 108, and then conveyed to the wireless interface 112 where it may be processed (e.g., packetized, encoded, etc.) and transmitted in accordance with ISO 18000-7.

During operation, the device 102 may also perform actions in response to ISO 18000-7 commands received via the wireless interface 112. For example, in response to a command received via the wireless interface 112, the device 102 may perform a search of the memory 110 and may generate and transmit one or more response packets via the wireless interface 112. Additionally or alternatively, the device 102 may generate one or more USB packets in response to such a command. A USB host device receiving such USB packets may perform a search of its memory and communicate the search results back to the device 102, which may then communicate the search results via the wireless interface 112.

In an exemplary embodiment, the device 102 may be operable to generate a log of a status of the device 102 and/or events occurring in the device 102. For example, a description of commands generated and/or received and responses generated and/or received by the device 102 may be logged in a text file. The text file may be stored in the memory 110 and/or may be output via the USB interface 106 for storage to a device having greater memory resources.

In an embodiment of the invention, the memory 110 may be utilized to store more recent and/or important data and older and/or less important data may be output via the USB interface 106 for storage in a memory that is external to the device 102.

In an exemplary embodiment, the device 102 may transmit search requests and/or receive, perform, and respond to search requests as is described in the above-incorporated U.S. patent application Ser. No. 13/267,640.

In an exemplary embodiment, the device 102 may be an embodiment of the smartcard described in the above-incorporated U.S. patent application Ser. No. 13/270,802 and may comprise circuitry and/or functionality described therein.

FIGS. 2A-2B depict exemplary form factors of an exemplary USB device which enables communications in conformance with ISO 18000-7. The USB device 102A comprises a connector 118 for connecting to an external antenna and a male USB connector for plugging into a USB port. The USB device 102B comprises an affixed and movable antenna 120 and a male USB connector for plugging into a USB port. The USB device 102C comprises an internal antenna (not shown) and a male USB connector for plugging into a USB port. Each of the devices shown in FIGS. 2A-2B may, for example, have length, width, and height dimensions on the order of centimeters.

Figure 3:
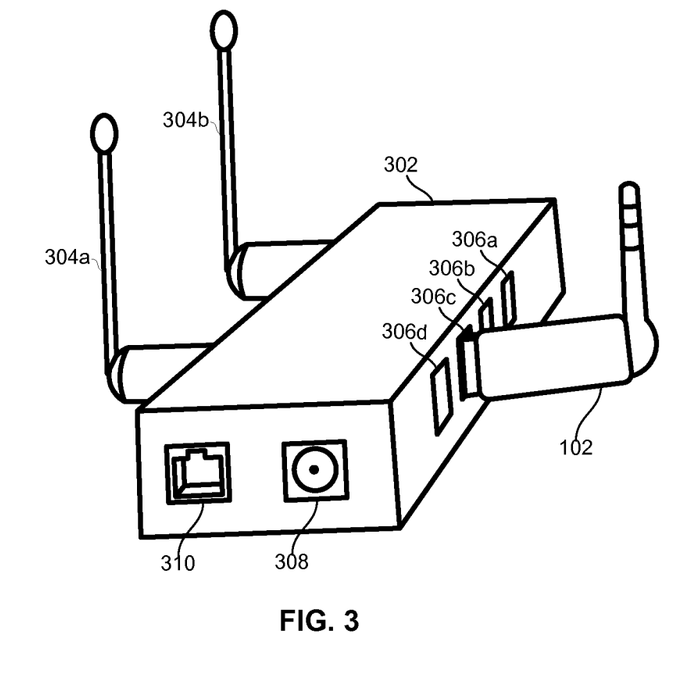
FIG. 3 depicts an exemplary network switching and/or routing device operable to provide network connectivity to an ISO 18000-7 enabled USB device.

FIG. 3 depicts an exemplary network switching and/or routing device operable to provide network connectivity to an ISO 18000-7 enabled USB device. The switching and/or routing device 302 comprises antennas 304a and 304b, USB ports 306a-306d, power port 308, and wired networking port 310.

The antennas 304a and 304b may enable the device 302 to transmit and receive signals in accordance with one or more wireless protocols. For example, the antennas 304a and 304b may enable the device 302 to communicate in conformance with IEE 802.11 standards.

The USB ports 306a-306d may enable the device 302 to communicate with other devices via one or more USB busses.

The device 302 may also be operable to supply power to other devices via the USB ports 306a-306d.

The device 302 may be operable to receive DC and/or AC power via the power port 308. The power port 308 may, for example, connect to an AC/DC converter which, in turn, connects to a 120VAC wall outlet.

The wired networking port 310 may enable the device 302 to connect to a wired network such as, for example, an Ethernet network, a DOCSIS network, a DSL network, a MoCA network, etc.

In operation, circuitry of the device 302 may be operable to switch (e.g., at OSI layer 2) and/or route (e.g., at OSI layer 3) packets between a wireless network (via the antennas 304a and 304b), a wired network (via the port 310), and one or more USB busses (via the USB ports 306a-306d).

In an exemplary embodiment, each of the USB ports 306a-306d may be assigned a layer 2 address (e.g., a MAC) and/or a layer 3 address (e.g., an IP address). Accordingly, a remote device coupled to the device 302 via the antennas 304a and 304b or via the port 310 may be enabled to send data to a particular one of USB ports 306a-306d by sending one or more packets to the layer 2 and/or layer 3 address associated with that particular USB port. For example, with the ISO 18000-7 device connected to USB port 306c as shown in FIG. 3, network devices may send messages to the USB device 102 by sending the messages to the layer 2 and/or layer 3 address associated with the USB port 306c.

In an exemplary embodiment, the device 302 may be operable to associate one or more of the USB ports 306a-306d with a destination layer 2 and/or layer 3 address. That is, packets received via a particular one of the USB ports 306a-306d may be automatically forwarded to the layer 2 and/or layer 3 address(es) associated with that particular USB port. Additionally and/or alternatively, the device 302 may be operable to parse USB packets received via the USB ports 306a-306d to extract a destination layer 2 and/or layer 3 address(es) from the packets, and then forward the packets to that layer 2 and/or layer 3 address(es). Accordingly, a device coupled to a particular one of the USB ports 306a-306d may be enabled to send messages to remote devices via a wired and/or wireless network. For example, with the ISO 18000-7 device connected to USB port 306c as shown in FIG. 3, the device 102 may output USB packets to the device 302 which may then forward the contents of the USB packets to the address that is associated with the USB port 306c and/or that is indicated in the USB packets.

Figure 4:
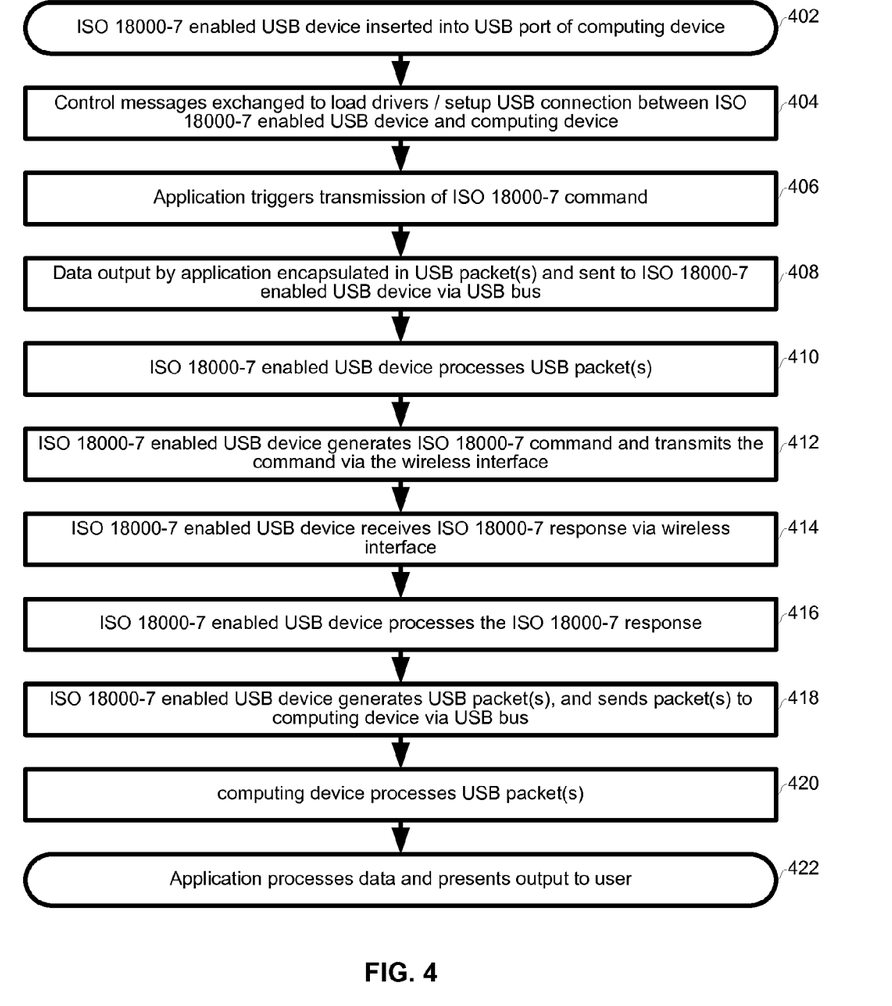
FIG. 4 is a flowchart illustrating exemplary steps for ISO 18000-7 communications via an ISO 18000-7 enabled USB device connected to a computing device.

FIG. 4 is a flowchart illustrating exemplary steps for ISO 18000-7 communications via an ISO 18000-7 enabled USB device connected to a computing device. The exemplary steps begin with step 402 in which an ISO 18000-7 enabled USB device 102 is connected to a USB port of a computing device (e.g., a laptop, tablet, smartphone, etc.).

In step 404, the USB device 102 and the computing device exchange control messages to identify and enumerate the USB device 102.

In step 406, an application running on the computing device (e.g., an application which has a user interface such as, for example, is described in the above-incorporated U.S. patent application Ser. No. 13/267,640) outputs data intended to trigger transmission of an ISO 18000-7 command. For example, the combination of the computing device and the USB device 102 may operate as an ISO 18000-7 interrogator and the message may be a command to interrogate ISO 18000-7 tags within range of the wireless interface 112.

In step 408, a USB bus adaptor of the computing device encapsulates the data output by the application into one or USB packets and transmits the packets to the device 102 via the USB bus.

In step 410, the USB device 102 receives the USB packets via the USB interface 106. The USB interface 106 and/or the CPU 108 processes the received packets to detect the data output by the application in step 406.

In step 412, the device 102 generates an ISO 18000-7 command based on the data received from the computing device. The ISO 18000-7 command is transmitted via the wireless interface 112.

In step 414, the device 102 receives one or more ISO 18000-7 responses via the wireless interface 112. The responses may have been transmitted by, for example, one or more ISO 18000-7 tags within communication range of the wireless interface 112.

In step 416, the device 102 processes the received response(s). For example, the device 102 may remove headers and/or other fields to recover the response data.

In step 418, the device 102 generates one or more USB packets based on the received responses. For example, the response data from the ISO 18000-7 responses may be encapsulated in the USB packet(s). The USB packet(s) are sent to the computing device via the USB interface 106.

In step 420, the computing device processes the received USB packet(s). For example, the headers of the USB packet(s) may be removed to recover the response data.

In step 422, the data recovered from the USB packets is conveyed to the application and the application presents the response(s) to a user.

Figure 5:
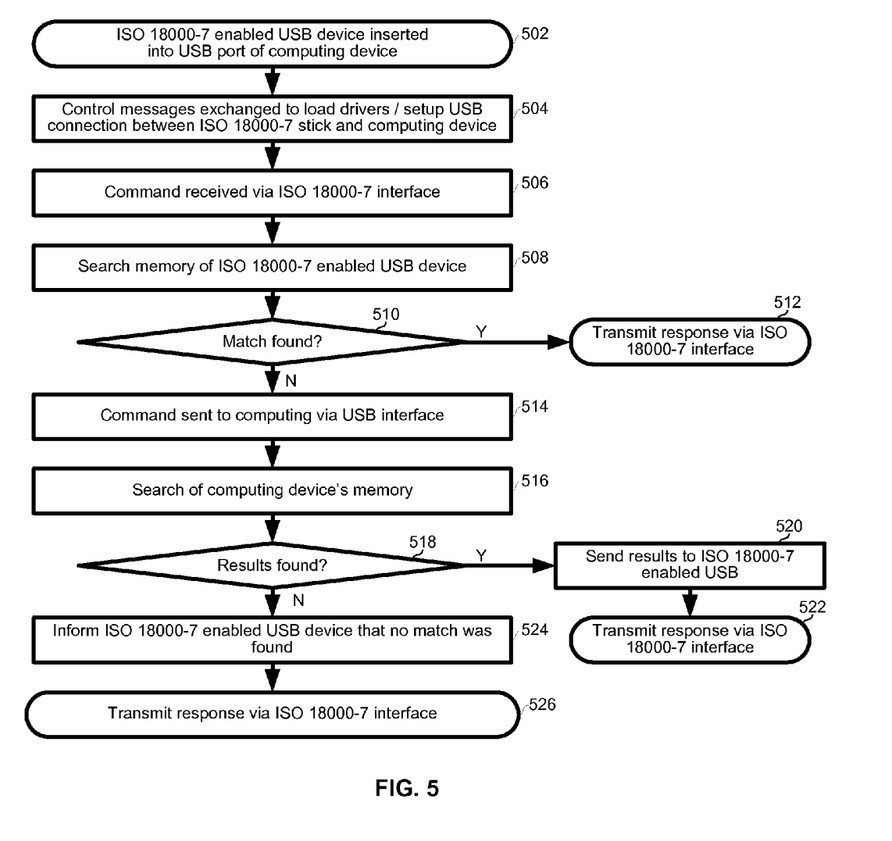
FIG. 5 is another flowchart illustrating exemplary steps for ISO 18000-7 communications via an ISO 18000-7 enabled USB device connected to a computer.

FIG. 5 is another flowchart illustrating exemplary steps for ISO 18000-7 communications via an ISO 18000-7 enabled USB device connected to a computer. The exemplary steps begin with step 502 in which an ISO 18000-7 enabled USB device 102 is connected to a USB port of a computing device (e.g., laptop, tablet, smartphone, etc.).

In step 504, the USB device 102 and the computing device exchange control messages to identify and enumerate the USB device 102.

In step 506, the USB device 102 receives an ISO 18000-7 command via the wireless interface 112. For example, the USB device 102 may operate as an ISO 18000-7 tag and receive a command from an ISO 18000-7 interrogator.

In step 508, the memory 110 of the USB device 102 is searched in response to the command received in step 506. For example, the memory 110 may be searched for a match of character, string, and/or number contained in the received command.

In step 510, it is determined whether a match was found in the memory 110. If a match was found, then in step 512, a response indicating that a match was found, and possibly containing addition response data, is generated and transmitted via the wireless interface 112.

Returning to step 510, if no match was found in the memory 110, then in step 514 the device 102 generates and sends one or more USB packet(s) to the computing device. The USB packet(s) may indicate the ISO 18000-7 command that was received in step 506.

In step 516, memory of the computing device is searched in response to the ISO 18000-7 command communicated in the USB packet(s). For example, the memory 110 may be searched for a match of character, string, and/or number contained in the received command.

In step 518, it is determined whether a match was found in the memory of the computing device. If a match was found, then, in step 520, a response indicating that a match was found, and possibly containing addition response data, is communicated to the USB device 102 in the form of one or more USB packets.

In step 522, the response data received from the computing device in step 520 is transmitted via the wireless interface 112 in the form of one or more ISO 18000-7 response packets.

Returning to step 518, if no match was found in the memory of the computing device, then, in step 524, the computing device sends one or more USB packets indicating such to the USB device 102.

In step 526, the USB device 102 may send an ISO 18000-7 response indicating that a match was not found. The USB device 102 may not send such a response if, for example, the command received in step 506 is one which requires a response only if a match was found.

Figure 6A:
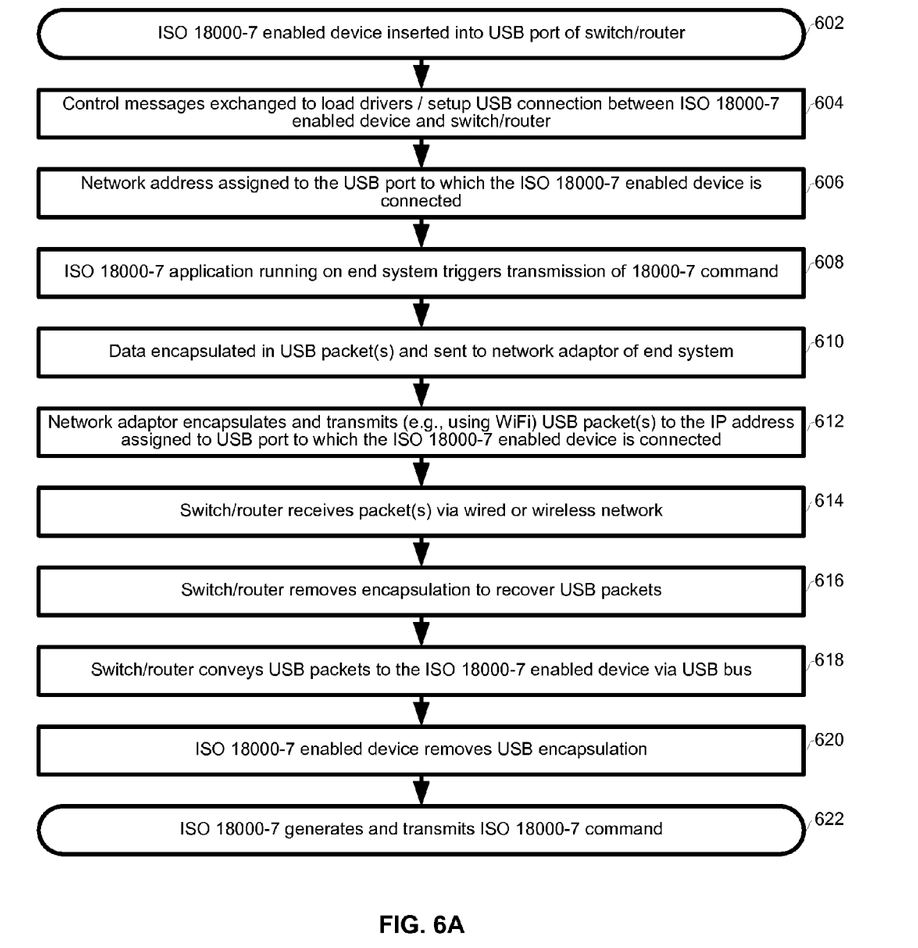
FIG. 6A is a flowchart illustrating exemplary steps for ISO 18000-7 communications via an ISO 18000-7 enabled USB device connected to a network switch and/or router.

FIG. 6A is a flowchart illustrating exemplary steps for ISO 18000-7 communications via an ISO 18000-7 enabled USB device connected to a network switch and/or router. The exemplary steps begin with step 602 in which the ISO 18000-7 enabled USB device 102 is connected to the USB port 306c of the switch/router 302.

In step 604, the USB device 102 and the switch/router 302 exchange control messages to identify and enumerate the USB device 102.

In step 606, the switch/router 302 may assign a network address (e.g., a MAC address and/or an IP address) to the USB device 102. The assignment may comprise, for example, associating the port 306c and the network address in a routing and/or switching table (e.g., in the case of an IP address) of the device 302. In other embodiments, a network address of the USB port 306c may be static. During step 606, the switch/router 302 may notify other devices that an ISO 18000-7 device is connected to the USB port 306c.

In step 608, an application running on a computing device that is connected to the switch/router 302 via a wired or wireless connection outputs data to trigger the transmission of an ISO 18000-7 command.

In step 610, the end system packetizes the command into one or more USB packets and then conveys the USB packets to a network adaptor of the end system.

In step 612, the network adaptor of the end system packetizes the USB packets into one or more network packets and transmits the network packets in accordance with whatever networking protocol(s) is/are in use (e.g., WiFi, wired Ethernet, etc.). The destination of the packets is the network address associated with USB port 306c

In step 614, the switch/router receives, via the antennas 304a and 304b or the port 310, the packets transmitted by the end system in step 612.

In step 616, the switch/router 302 decapsulates the received packets to recover the USB packets generated by the end system in step 610.

In step 618, the switch/router 302 conveys the USB packets to the USB device 102 via the USB port 306c.

In step 620, the device 102 decapsulates the USB packets to recover the data generated by the application in step 608.

In step 622, the device 102 generates one or more ISO 18000-7 commands based on the received data and transmits the commands via the wireless interface 112.

Figure 6B:
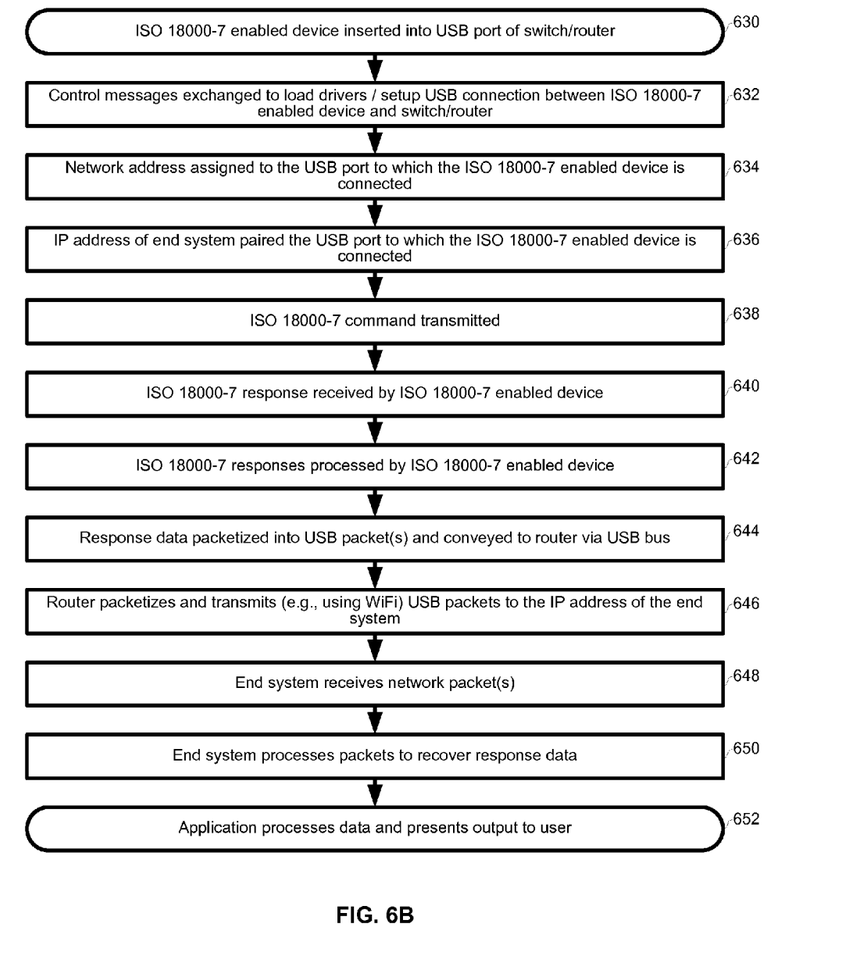
FIG. 6B is another flowchart illustrating exemplary steps for ISO 18000-7 communications via an ISO 18000-7 enabled USB device connected to a network switch and/or router.

FIG. 6B is a flowchart illustrating exemplary steps for ISO 18000-7 communications via an ISO 18000-7 enabled USB device connected to a network switch and/or router. The exemplary steps begin with step 630 in which the ISO 18000-7 enabled USB device 102 is connected to the USB port 306c of the switch/router 302 operable to perform network switching and/or routing operations (e.g., Ethernet-based switching and/or IP-based routing).

In step 632, the USB device 102 and the switch/router 302 exchange control messages to identify and enumerate the USB device 102.

In step 634, a network address (e.g., a MAC address and/or an IP address) may be assigned to the USB port 306c of the switch/router 302. The assignment may comprise, for example, associating the port 306c and the network address in a routing and/or switching table (e.g., in the case of an IP address) of the device 302. In other embodiments, a network address of the USB port 306c may be static. During step 606, the switch/router 302 may notify other devices that an ISO 18000-7 device is connected to the USB port 306c.

In step 636, the switch/router 302 may be configured to pair the USB port 306c with a network address assigned to an end system (e.g., laptop, tablet, smartphone, server, etc.) connected to the switch/router 302. In this manner, packets received by the switch/router 302 via the USB port 306c may be automatically forwarded to the paired network address without the USB device 102 having to concern itself with network addresses. That is, the switching/routing may be transparent to the USB device 102 such that it thinks it is connected directly to the end system via a USB bus. In another exemplary embodiment, USB packets received via the port 306c may contain destination network addresses which the switch/router 302 may inspect to determine which address to send the packets to.

In step 638, the device 102 transmits an ISO 18000-7 command.

In step 640, the device 102 receives one or more ISO 18000-7 responses via the wireless interface 112. The responses may have been transmitted by, for example, one or more ISO 18000-7 tags within communication range of the wireless interface 112.

In step 642, the device 102 processes the received response(s). For example, the device 102 may remove headers and/or other fields to recover the response data.

In step 644, the device 102 generates one or more USB packets in based on the received responses. For example, the response data from the ISO 18000-7 responses may be encapsulated in the USB packet(s). The USB packet(s) may be sent to the switch/router via the USB port 306c.

In step 646, the switch/router 302 packetizes and transmits the received USB packet(s) via the antennas 304a and 304b or the port 310 in accordance with the network protocol(s) being used (e.g., WiFi or Ethernet). The network packet(s) are transmitted to the network address paired with the USB port 306c in step 636.

In step 648, the end system receives the packets via the wired or wireless network.

In step 650, the end system process the received packets to recover the ISO 18000-7 response data. For example, the end system removes the formatting of the network protocol(s) in use (e.g., WiFi, Ethernet, etc.) and then decapsulates the USB packet(s) to recover the response data.

In step 652, the response data may be conveyed to the application, which may present the response(s) to a user of the end system.

In accordance with an exemplary embodiment of the invention, the circuitry of the device 102 comprises a Universal Serial Bus (USB) interface 106 and a wireless interface 112 operable to communicate in accordance with the ISO 18000-7 standard. The device 102 may be operable to receive a command via the USB interface 106 and transmit the command via the wireless interface 112. A form factor of the USB device 102 may be such that it can be plugged directly into a USB port without any external cabling between the USB device and said USB port (i.e., may have a form factor similar of a "USB stick" or a "thumb drive"). During enumeration of the USB device 102, it may communicate one or more descriptors according to the USB Device Class Definition for Printing Devices and the command may be received via a Bulk OUT pipe of the USB bus.

The device 102 may comprise a memory 110 in which a filesystem resides. The device 102 may be operable to search the filesystem in response to the command received via the USB interface 106 and/or in response to a command received via the wireless interface 112. The one or more circuits may be operable to output results of the search via the wireless interface 112 and/or the USB interface 106. The device 102 may be operable to read data from the memory 110 and output the data via the USB interface 106 and/or the wireless interface 112. The device 102 may be operable to receive data via the USB interface 106 and/or the wireless interface and write the received data to the memory 110. The one or more circuits may be operable to generate log data of activities and/or events occurring in the USB device 102 and output the log data via the USB interface 106.

The USB device 102 may be connected to a network switch and/or router 302 via the USB interface 106 and a USB port 306c of the network switch and/or router 302. The USB port 306c may be assigned a network address by the network switch and/or router 302. The network switch and/or router may be operable to receive network packets destined for the assigned network address and convey contents of the received network packets to the USB device 102 via the USB interface 106 and the USB port 306c.

The USB device 102 may be a client device connected to the network switch and/or router 302 via the USB interface 106. The network switch and/or router 302 may be operable to associate the client USB device 102 with a network address of a host USB device (e.g., a computing device connected to the network switch and/or router via a wired connection to port 310). The network switch and/or router 302 may be operable to receive data from the client USB device 102 via the USB interface 106. The network switch and/or router 302 may be operable to transmit the received data to the network address of the host USB device (e.g., via the port 310).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for plug and play, networkable ISO 18000-7 connectivity.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A USB device comprising:
one or more circuits comprising a Universal Serial Bus (USB) interface, a first memory in which a filesystem resides, and a wireless interface, said one or more circuits being operable to:
receive a command via said USB interface;
transmit said command via said wireless interface; and
search said filesystem in response to said command received via said USB interface and/or in response to a command received via said wireless interface; and
wherein:
said search is for a character, string, and/or number contained in said command received via said wireless interface;
said one or more circuits are coupled, via said USB interface, to a computing device which comprises a second memory in which a filesystem resides; and
said one or more circuits are operable to:
perform a search of said filesystem of first memory for said character, string, and/or number;
if said search of said filesystem of said first memory does locate said character, string, and/or number, transmit a response, via said wireless interface, indicating that said character, string, and/or number was found;
if said search of said filesystem of said first memory does not locate said character, string, and/or number, send, via said USB interface, one or more USB packets to said computing device to trigger a search of said filesystem of said second memory for said character, string, and/or number;
if said search of said filesystem of said second memory does locate said character, string, and/or number, transmit a response, via said wireless interface, indicating that said character, string, and/or number was found; and
if said search of said filesystem of said second memory does not locate said character, string, and/or number, transmit a response, via said wireless interface, indicating that said character, string, and/or number was not found.

2. The system of claim 1, wherein a form factor of said USB device is such that it can be plugged directly into a USB port without any external cabling between said USB device and said USB port.

3. The system of claim 1, wherein, during enumeration of said USB device, said one or more circuits communicate one or more descriptors according to the USB Device Class Definition for Printing Devices.

4. The system of claim 3, wherein said command is received via a Bulk OUT pipe of said USB bus.

5. The system of claim 1, wherein said one or more circuits are operable to output results of said search via said wireless interface and/or said USB interface.

6. The system of claim 1, wherein said one or more circuits are operable to read data from said memory and output said data via said USB interface and/or said wireless interface.

7. The system of claim 1, wherein said one or more circuits are operable to receive data via said USB interface and/or said wireless interface and write said received data to said memory.

8. The system of claim 1, wherein said one or more circuits are operable to generate log data of activities and/or events occurring in said USB device and output said log data via said USB bus.

9. The system of claim 1, wherein:
said USB device is connected to a network switch and/or router via said USB interface and a USB port of said network switch and/or router;
said USB port is assigned a network address by said network switch and/or router;
said network switch and/or router is operable to receive network packets destined for said assigned network address and convey contents of said received network packets to said USB device via said USB interface and said USB port.

10. The system of claim 1, wherein:
said USB device is a client device connected to a network switch and/or router via said USB interface;
said network switch and/or router is operable to associate said client USB device with a network address of a host USB device;
said network switch and/or router is operable to receive data from said client USB device via said USB interface; and
said network switch and/or router is operable to transmit said received data to said network address of said host USB device.

11. A USB device comprising:
one or more circuits comprising a Universal Serial Bus (USB) interface, a first memory in which a filesystem resides, and a wireless interface, said one or more circuits being operable to:
receive data via said wireless interface;
transmit said data via a USB interface; and
search said filesystem in response to said command received via said USB interface and/or in response to a command received via said wireless interface; and
wherein:
said search is for a character, string, and/or number contained in said command received via said wireless interface;
said one or more circuits are coupled, via said USB interface, to a computing device which comprises a second memory in which a filesystem resides; and
said one or more circuits are operable to:
perform a search of said filesystem of first memory for said character, string, and/or number;
if said search of said filesystem of said first memory does locate said character, string, and/or number, transmit a response, via said wireless interface, indicating that said character, string, and/or number was found;
if said search of said filesystem of said first memory does not locate said character, string, and/or number, send, via said USB interface, one or more USB packets to said computing device to trigger a search of said filesystem of said second memory for said character, string, and/or number;
if said search of said filesystem of said second memory does locate said character, string, and/or number, transmit a response, via said wireless interface, indicating that said character, string, and/or number was found; and
if said search of said filesystem of said second memory does not locate said character, string, and/or number, transmit a response, via said wireless interface, indicating that said character, string, and/or number was not found.

12. The system of claim 11, wherein a form factor of said USB device is such that it can be plugged directly into a USB port without any external cabling between said USB device and said USB port.

13. The system of claim 11, wherein, during enumeration of said USB device, said one or more circuits communicate one or more descriptors according to the USB Device Class Definition for Printing Devices.

14. The system of claim 13, wherein said data is transmitted via a Bulk IN pipe of said USB bus.

15. The system of claim 11, wherein said one or more circuits are operable to output results of said search via said wireless interface and/or said USB interface.

16. The system of claim 11, wherein said one or more circuits are operable to read data from said memory and output said data via said USB interface and/or said wireless interface.

17. The system of claim 11, wherein said one or more circuits are operable to write said received data to said memory.

18. The system of claim 11, wherein said one or more circuits are operable to generate log data of activities and/or events occurring in said USB device and output said log data via said USB bus.

19. The system of claim 11, wherein:
said USB device is connected to a network switch and/or router via said USB interface and a USB port of said network switch and/or router;
said USB port is assigned network address by said network switch and/or router;
said network switch and/or router is operable to receive network packets destined for said assigned network address and convey contents of said received network packets to said USB device via said USB interface and said USB port.

20. The system of claim 11, wherein:
said USB device is a client device connected to a network switch and/or router via said USB interface;
said network switch and/or router is operable to associate said client USB device with a network address of a host USB device;
said network switch and/or router is operable to receive data from said client USB device via said USB interface; and
said network switch and/or router is operable to transmit said received data to said network address of said host USB device.

* * * * *